Sept. 29, 1953     H. J. HAGEMEYER, JR     2,653,964
PREPARATION OF NITRILES AND CATALYSTS THEREFOR
Filed April 12, 1952
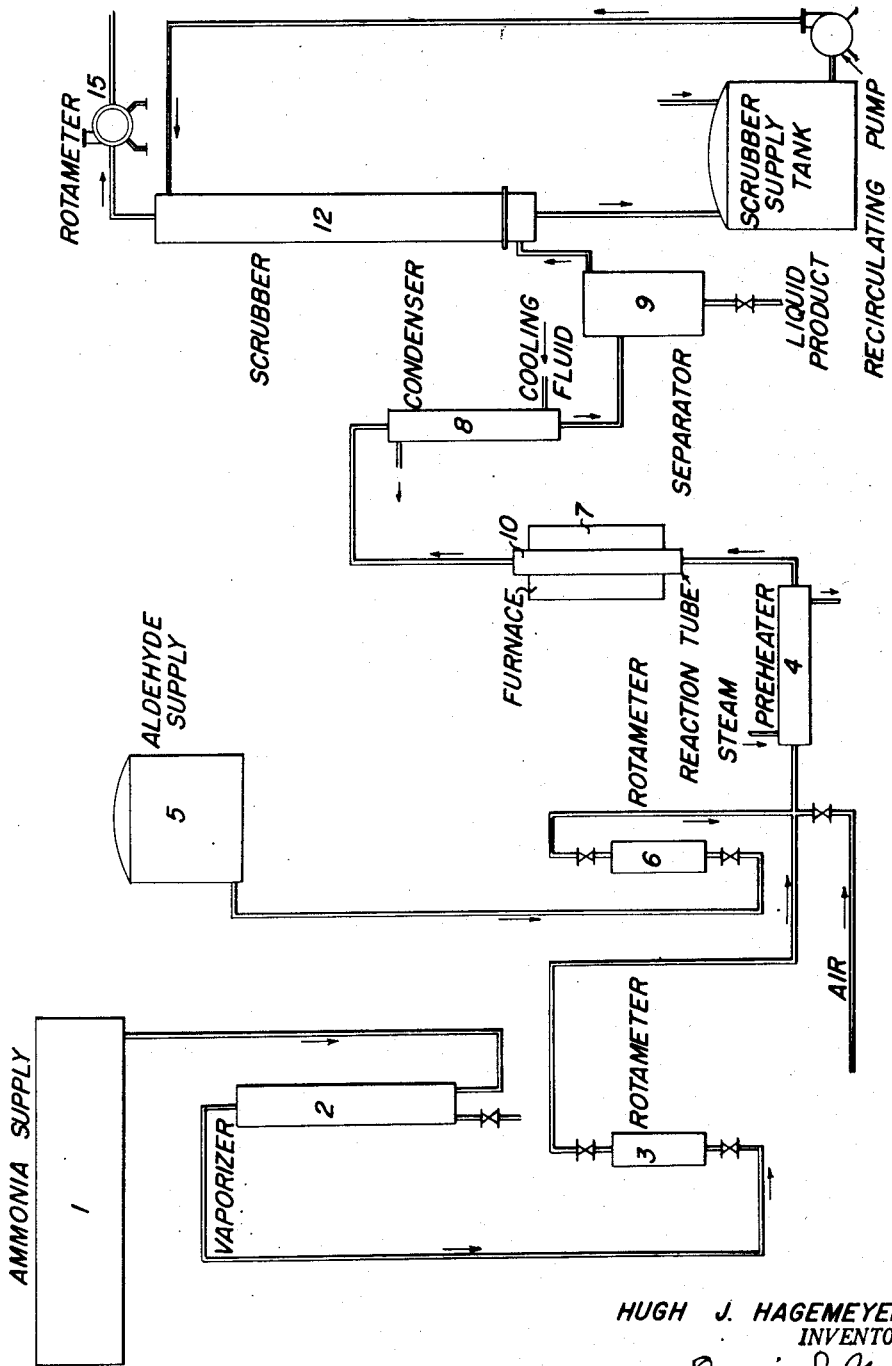
HUGH J. HAGEMEYER JR.
INVENTOR.
BY
ATTORNEYS Patented Sept. 29, 1953

2,653,964

UNITED STATES PATENT OFFICE 2,653,964

PREPARATION OF NITRILES AND CATALYSTS THEREFOR

Hugh J. Hagemeyer, Jr., Kingsport, Tenn., assignor to Eastman Kodak Company, Rochester, N. Y., a corporation of New Jersey Application April 12, 1952, Serial No. 281,984

5 Claims. (Cl. 260—465.1)

The present invention relates to the manufacture of nitriles by the reaction of aldehydes with ammonia. More particularly the invention is concerned with a process for the manufacture of aliphatic nitriles by the vapor-phase reaction of ammonia with aliphatic aldehydes in the presence of novel catalytic material.

The preparation of nitriles by means of the dehydration and dehydrogenation of aldehydes is discussed by Mowry in Chemical Reviews, volume 42, No. 2, page 249 (April 1948). One process which has been disclosed for the preparation of nitriles by the reaction of ammonia and aldehydes suggests the use of a metallic catalyst comprising cobalt. Among other catalysts which have been suggested for promoting the reaction of aldehydes with ammonia to produce nitriles are those such as thorium oxide, chromium oxide on alumina and other typical dehydrogenation catalysts.

It is an object of the present invention to provide an improved process for the preparation of nitriles from aldehydes. Another object of the invention is the provision of a novel catalyst capable of producing higher yields and conversions in the reaction of aldehydes and ammonia. A still further object of the invention is the provision of an improved method for obtaining nitriles such as propionitrile and isobutyronitrile from the corresponding aldehydes by catalytic vapor-phase reaction with ammonia.

I have found that the objects enumerated above and other objects which will appear herein may be achieved by carrying out the vapor-phase reaction of aldehydes with ammonia in the presence of a catalyst comprising the combination of a dehydrogenating oxide (or metal of an easily reducible dehydrogenating oxide) with an essentially neutral supporting metal oxide. I have found that when dehydrogenating oxides of the prior art are carried on supports which are essentially neutral metallic oxides, the resulting catalyst provides a much higher specific activity for the desired reaction, resulting in higher conversions and yields than heretofore produced. I have found that a most advantageous embodiment of the invention resides in a catalyst comprising chromium sesquioxide ($Cr_2O_3$) on zirconia ($ZrO_2$).

In accordance with the invention a mixture of aldehyde vapor and ammonia is passed over the catalyst at a suitable temperature within the range of 300°–800° C. and thereupon the resulting nitrile is separated from the effluent reaction products by distillation.

The active portion of the catalyst of the invention comprises any of a number of known metal oxides which serve in a dehydrogenating capacity. This group of oxides includes those dehydrogenating metal oxides which are easily reducible to metal under the reaction conditions. Where a catalyst of this type is to be used, a prereduced material comprising free metal on an oxide carrier may be employed. Among the dehydrogenating oxides suitable for the invention may be listed: chromium sesquioxide, molybdenum dioxide, molybdenum sesquioxide, vanadium pentoxide, vanadium trioxide, and cobalt oxide.

The supporting material for the dehydrogenating catalyst of the invention comprises a neutral metal oxide of the type exemplified by zirconia ($ZrO_2$) and titania ($TiO_2$). The supporting neutral oxide advantageously is selected from any of the oxides of metals of groups 4 through 6, inclusive of the periodic chart, which oxides also have a pH in the range of 6–8. Zirconia appears to have special merit as a supporting material and this is particularly true when it is employed in combination with chromium sesquioxide. Promoters of suitable types known to the art may be incorporated in the catalyst of the invention if so desired.

It will be clear to those skilled in the art that the invention is applicable to a large number of aldehydes. It may be said that the process is of specific advantage with aldehydes of the formula $R(CHO)_n$ wherein R is a hydrocarbon radical of 1 to 8, inclusive, carbon atoms, and $n$ has a value of 1 or 2. The process is of particular merit in the case of aliphatic aldehydes, i. e., the case wherein R is an aliphatic hydrocarbon radical of 1 to 8, inclusive, carbon atoms, $n$ being 1 or 2, and especially where the aliphatic hydrocarbon radical is saturated. The invention is particularly valuable for use with the unsubstituted lower saturated aliphatic aldehydes and among those with which the invention is primarily concerned are included: acetaldehyde, propionaldehyde, n-butyraldehyde, isobutyraldehyde, n-valeraldehyde, n-hexaldehyde, n-heptaldehyde, etc., i. e., those saturated aliphatic aldehydes wherein R is an alkyl radical of 1–8, preferably 2–8 carbon atoms.

While the invention primarily is concerned with unsubstituted aldehydes (i. e., R is an unsubstituted hydrocarbon radical), it will be understood that there are instances in which the invention will be operative with substituted aldehydes.

The nature of the ammonia employed is of no significance except that of course it should be of an acceptable degree of purity such as will be recognized by those familiar with the art.

The reaction is represented by the following equation:

$$R(CHO)_n + NH_3 \rightarrow R(CN)_n + H_2O + H_2$$

in which R and $n$ have the meanings designated above. The mole ratio of ammonia to aldehyde initially introduced into the reaction vessel may vary widely, but it is generally within the range of 1.5:1 to 10:1.

While the reaction may be operative in a wide range of temperatures as pointed out above, the temperature preferably is maintained within the range of 350°–550° C. and most advantageously a temperature of 480° C. plus or minus 30° C. is provided. Atmospheric pressure normally is satisfactory for conduct of the reaction but it will be understood by those skilled in the art that pressures above or below normal may be employed where so desired. Diluents such as water and inert gases (nitrogen and the like) may be used. However, high conversions and yields are obtained without the use of diluents.

The procedure for contacting the ammonia with the aldehyde vapor may be selected in accordance with suggestions of the prior art. That is to say, the two reactants may be introduced into the catalyst chamber separately and mixed therein, or it may be preferable to mix the two in a preheater or at some other place before they reach the reaction zone, i. e. the catalyst bed. The mixture of reactants is maintained in contact with the catalyst bed and at the temperatures thereof for a short period of time preferably within the range of 0.5 to 5.0 seconds. It will be appreciated however that the specific temperatures, pressures and contact times (and gas velocities) are interrelated in effect and therefore may be more widely varied under the proper circumstances.

The effluents from the catalyst chamber are cooled quickly, for example, by means of a glycol or water-cooled condenser, and are then conducted to a fractionation system for separation of the desired products. Excess ammonia is conveniently recovered by scrubbing the off-gas with water. Unchanged aldehyde and high-boiler products may be recycled through the reactor space. The invention is illustrated in the following examples:

*Example 1.—Preparation of isobutyronitrile*

Figure 1 is a flow diagram of the apparatus used. Ammonia from a cylinder 1 was passed through a 1" pipe 2 which served as a vaporizer and oil separator. The flow of gaseous ammonia was controlled at the rotameter 3. Isobutyraldehyde from a storage tank 5 was metered through rotameter 6 and joined with ammonia in the preheater tube 4. The preheater tube was jacketed for 90 pound steam. The reactants were passed upward through a 1½" O. D. reactor tube 10 of stainless steel. The reactor tube was heated in an electric furnace 7, gaseous products were condensed in glycol cooled condenser 8, and liquid product was separated from the off-gas (comprised largely of hydrogen and unreacted ammonia) in a stainless steel separator pot 9. The off-gas was washed with water to recover excess ammonia in a water scrubber 12. The washed off-gas was then metered through a wet test meter 15 and vented.

It was found that a working cycle of 6 hours running and 2 hours regeneration with air kept the catalyst in a state of high activation for long periods of time.

The product collected from the receiver 9, was separated into water and organic layers. The water layer was distilled to strip off the organic material which was combined with the original organic layer and distilled to recovered the product. A dry and ammonia free nitrile product was obtained by azeotroping out the water dissolved in the organic layer prior to the fractionation of the product.

The chromium sesquioxide ($Cr_2O_3$) on zirconium oxide ($ZrO_2$) catalyst produced none of the pyridine derivatives and other non-recoverable nitrogenous compounds characteristic of the prior art catalysts, and the high-boiler present in the reaction product was comprised largely of an alkylidene alkyl vinyl amine which could be recycled with additional ammonia and converted to the nitrile, or hydrolyzed with aqueous sulfuric acid to regenerate the starting aldehyde.

The data on representative runs with several catalyst types is listed in Table I. In the table the conversion to isobutyronitrile (IBN) is the conversion per pass of the aldehyde feed (Ald.) to nitrile. The yield to isobutyronitrile is calculated as the actual yield per pass and is lower than an utlimate yield in that it does not take into account the nitrile which is obtainable by recycling the high-boiler, isobutylidene-beta, beta-dimethylvinylamine. The table indicates the superiority of the catalysts of the invention over the chromium sesquioxide-on-alumina catalyst of the prior art, which was used in carrying out runs 8, 37, 48, 52 and 53.

TABLE I

| Run No. | Catalyst Comp. | Temp., °C. | Mole Ratio $NH_3$/Ald. | Contact Time, Seconds | Percent Ald. Used | Percent Conv. to IBN | Percent Yield to IBN |
|---|---|---|---|---|---|---|---|
| 48 | 12% $Cr_2O_3$ on $Al_2O_3$ | 500 | 4.18 | 0.592 | 100 | 61 | 61 |
| 52 | do | 433 | 1.03 | 1.430 | 95.5 | 56 | 58.6 |
| 53 | do | 449 | 4.20 | 1.430 | 96.3 | 65.5 | 68 |
| 8 | do | 510 | 1.56 | 1.080 | 95.8 | 62.3 | 74 |
| 37 | do | 488 | 2.20 | 1.035 | 91.0 | 70.5 | 77.0 |
| 96 | 12% $Cr_2O_3$ on $ZrO_2$ | 453 | 2.08 | 1.232 | 98.0 | 89.5 | 91.2 |
| 98 | do | 500 | 2.03 | 1.175 | 98.7 | 89.2 | 90.4 |
| 99 | do | 450 | 1.99 | 1.220 | 90.7 | 83.3 | 91.7 |
| 103 | do | 505 | 2.00 | 1.780 | 97.5 | 89.1 | 91.8 |
| 109 | 30% Co on $Al_2O_3$ | 500 | 2.12 | 1.350 | 94.2 | 46.0 | 48.8 |
| 110 | do | 482 | 1.96 | 1.314 | 91.4 | 53.4 | 58.4 |
| 111 | 30% Co on $ZrO_2$ | 469 | 1.94 | 1.302 | 93.1 | 78.4 | 84.2 |
| 112 | do | 500 | 2.01 | 1.343 | 97.0 | 86.1 | 89.0 |
| 119 | 12% $Cr_2O_3$ on $TiO_2$ | 500 | 2.08 | 1.510 | 96.3 | 84.7 | 91.3 |

The remarkable influence of the zirconia support is obvious from the above data.

In Table II several runs in which high-boilers were recycled with additional ammonia through the reactor space in the absence of any aldehyde feeds are reported. The conversions to isobutyronitrile averaged between 70 to 83% and here again the chromium sesquioxide on zirconia catalysts was superior to the chromia on alumina catalyst.

TABLE II

| Run No. | Feed stock | Catalyst Comp. | Temp., °C. | $NH_3$/Ald. Feed Ratio | Contact time, secs. | Percent Conv. IBN | Percent Yield IBN |
|---|---|---|---|---|---|---|---|
| 8 (a) | Dist. Hiboilers | 12% $Cr_2O_3$ on $Al_2O_3$ | 544 | 2.70 | 1.69 | 48.3 | 76 |
| 17 | do | do | 587 | 3.04 | 1.91 | 31.9 | 55.8 |
| 12 | do | 12% $Cr_2O_3$ on $ZrO_2$ | 561 | 2.53 | 1.68 | 63.4 | 83.0 |
| 18 | Crude Hiboilers | do | 568 | 2.63 | 1.79 | 51.3 | 80.0 |
| 19 | do | 12% $Cr_2O_3$ on $Al_2O_3$ | 546 | 3.13 | 1.61 | 13.8 | 31.4 |

These runs are indicative of the better conversions and yields realized where zirconia is used as a support for the dehydrogenation metal and/or its oxide.

The catalyst of the invention may be prepared by any one of a number of generally accepted procedures for manufacture of metal or metal oxide catalysts carried on metal oxide supporting material. In this regard, it is to be noted that the designation "supporting material" as employed herein is intended to be inclusive of the various possibilities which normally are included within the terms "carrier" and "support." That is to say, the relationship of the active portion of the catalyst with the catalyst support may be any of those commercially referred to under the terms "carried by" and "supported on" regardless of the physical or chemical nature of the bond, if any, between the two materials. Furthermore, it does not appear to be critical what relative proportion of dehydrogenating oxide (or metal) to supporting oxide is employed. Any limitations dictated in this regard would seem to call for merely a sufficiency of dehydrogenating oxide (or metal) to afford adequate contact with the reacting gases and a sufficiency of supporting oxide to afford adequate physical support and availability of the dehydrogenating oxide. However, I have found it advantageous to employ the supporting material in major quantities and the dehydrogenating substance in relatively minor quantities. Efficient results are obtainable with a chromium sesquioxide on zirconia catalyst where the zirconia comprises about 88% ± 8% of the weight of the catalyst. The method of preparing catalysts for use in the invention is illustrated in the following examples:

*Example 2.—Chromium sesquioxide on zirconia*

200 grams of chromic acid ($CrO_3$) was dissolved in 3 liters of water and 100 cc. of ethyl alcohol was added gradually over a period of one hour. The solution was allowed to stand for four hours and the addition of alcohol was repeated. The solution was heated to reflux, 848 grams of zirconium oxide ($ZrO_2$) powder was stirred in, and the refluxing was continued for 24 hours. At the end of this period the solution was filtered and the solid obtained was dried at 100° C. to a hard black cake, which was broken up to a 6 to 8 mesh size. Further drying of the catalyst was accomplished by heating the catalyst in place up to the desired reaction temperature either in the presence or absence of a stream of hydrogen or other reducing gas.

*Example 3.—Chromium sesquioxide on zirconia*

200 grams of chromic nitrate nonahydrate ($Cr(NO_3)_3 \cdot 9H_2O$) was dissolved in 2 liters of water and 75 grams of ammonium acetate was added. The solution was heated to boiling and then cooled to 25° C. A solution of 400 grams of 10% aqueous ammonia was added slowly while stirring the mixture vigorously. When the precipitation was complete 212 grams of zirconium oxide ($ZrO_2$) was stirred in and the mixture was allowed to stand over night. The catalyst slurry was filtered and the cake was thoroughly washed with water, filtered and dried at 100° C. The catalyst was roasted at 600° C. in a stream of hydrogen prior to use.

*Example 4.—Chromium sesquioxide on titania*

A chromia on titania catalyst was prepared in the same way as Example 2, except that the 848 grams of zirconia was replaced with a corresponding amount of titania ($TiO_2$).

*Example 5.—Vanadium pentoxide (or trioxide) on zirconia*

117 grams of ammonium metavanadate was dissolved in water and 400 grams of zirconia was slurried in this solution. An excess of nitric acid was added to precipitate vanadic acid and after stirring for 8 hours the solution was filtered and washed with hot nitric acid to remove ammonium salts. The precipitate was then washed with hot water and dried at 100° C. prior to roasting at 400° C. to drive off residual water and to decompose any nitrate that remained. The vanadium pentoxide on zirconia catalyst may or may not be reduced to vanadium trioxide in a stream of hydrogen at 400°–600° C. before use as a dehydrogenation catalyst.

*Example 6.—Cobalt metal on zirconia*

300 grams of cobalt nitrate hexahydrate ($Co(NO_3)_2 \cdot 6H_2O$) was dissolved in two liters of water and heated to 60° C. The cobalt was precipitated with excess sodium carbonate and zirconia ($ZrO_2$) was added to the fresh precipitate slurried in water. After the precipitation and thorough mixing with zirconia, the wet cake was washed three times with hot water and then transferred to a dryer. The drying operation was carried out at 110° C. in a steam dryer and care was taken to see that the metal carbonates were not decomposed to the oxide in the drying process. The cobalt carbonate on zirconia catalyst was reduced to cobalt metal on zirconia by preheating in a stream of hydrogen at 200°–600° C. prior to use as a dehydrogenation catalyst.

It will be obvious that the invention is of utility in the preparation of many useful aliphatic nitriles corresponding to the aliphatic aldehydes employed in the reaction. The nitriles which may be prepared by practice of the invention are of course those of the formula $R(CN)_n$ in which R is a hydrocarbon radical of 1 to 8, inclusive, carbon atoms, and $n$ has a value of 1 or 2. A most advantageous embodiment of the invention is that in which there are prepared nitriles of the formula $R(CN)_n$ in which $n$ has a value of 1 or 2 and R is a saturated unsubstituted alkyl group such as methyl, ethyl, propyl, isopropyl, n-butyl, isobutyl, n-amyl, isoamyl, etc. The invention finds particular utility in the preparation from propionaldehyde and isobutyraldehyde of propionitrile and isobutyronitrile.

I claim:

1. In the process for the preparation of isobutyronitrile by the vapor phase catalytic reaction of isobutyraldehyde with ammonia, the improved method comprising contacting a gaseous mixture of isobutyraldehyde and ammonia at a temperature of 480°±30° C. for a time not exceeding 5 seconds with a catalyst essentially consisting of chromium sesquioxide ($Cr_2O_3$) on zirconia ($ZrO_2$).

2. In the process for the preparation of propionitrile by the vapor-phase catalytic reaction of propionaldehyde with ammonia, the improved method comprising contacting a gaseous mixture of propionaldehyde and ammonia at a temperature of 480°±30° C. for a time not exceeding 5 seconds with a catalyst essentially consisting of chromium sesquioxide ($Cr_2O_3$) on zirconia ($ZrO_2$).

3. A method for the preparation of a saturated nitrile comprising conducting a vapor-phase catalytic reaction of ammonia with an aldehyde in accordance with the equation $$R(CHO)_n + NH_3 \rightarrow R(CN)_n + H_2O + H_2$$

wherein R is a hydrocarbon radical of 1 to 8, inclusive, carbon atoms, and $n$ is an integer having a value in range of 1 to 2, inclusive, at a temperature in the range of 350°–550° C. in the presence of a catalyst comprising a chromium sesquioxide ($Cr_2O_3$) carried on an essentially neutral supporting oxide selected from the group consisting of zirconia ($ZrO_2$) and titania ($TiO_2$).

4. A process as defined in claim 3 wherein the aldehyde is a saturated unsubstituted acyclic aliphatic monoaldehyde and the supporting oxide comprises 80±8% by weight of the catalyst.

5. A process as defined in claim 4 wherein the supporting oxide is zirconia ($ZrO_2$).

HUGH J. HAGEMEYER, Jr.

References Cited in the file of this patent

UNITED STATES PATENTS

| Number | Name | Date |
|---|---|---|
| 2,337,421 | Spence et al. | Dec. 21, 1943 |
| 2,337,422 | Spence et al. | Dec. 21, 1943 |
| 2,385,552 | Spence et al. | Sept. 25, 1945 |
| 2,443,420 | Gresham | June 15, 1948 |
| 2,452,187 | Gresham | Oct. 26, 1948 |
| 2,525,818 | Mahan | Oct. 17, 1950 |

OTHER REFERENCES

Amiel et al. Compt. Rend. (Fr. Acad.), vol. 224, pp. 483–4 (1947).

Mowry, Chem. Reviews, vol. 42, pp. 247–250 (1948).